G. S. McHenry. Street Carriages.
118255        PATENTED AUG 22 1871
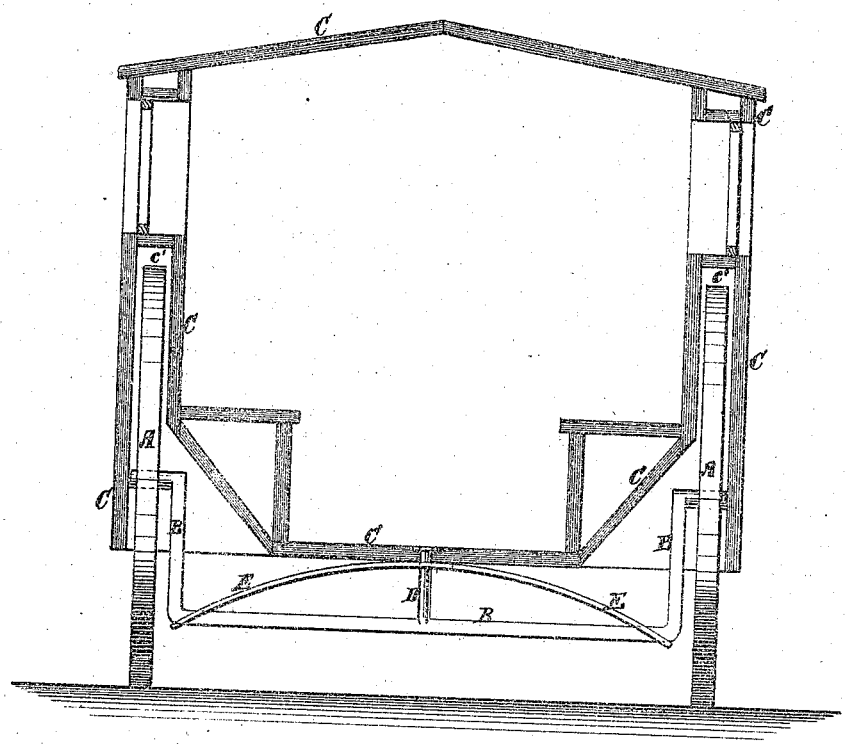
Witnesses:
A. Bennewendorf.
Wm. E. E. Smith.
Inventor:
G. S. McHenry.
Per Munn & Co.
Attorneys.

UNITED STATES PATENT OFFICE.

GEORGE S. McHENRY, OF KANSAS CITY, MISSOURI.

IMPROVEMENT IN STREET-CARRIAGES.

Specification forming part of Letters Patent No. 118,255, dated August 22, 1871.

*To all whom it may concern:*

Be it known that I, GEORGE S. MCHENRY, of Kansas City, in the county of Jackson and State of Missouri, have invented a new and useful Improvement in Street-Carriages; and I do hereby declare that the following is a full, clear, and exact description thereof, which will enable others skilled in the art to make and use the same, reference being had to the accompanying drawing forming part of this specification, in which the figure is a vertical cross-section of my improved carriage illustrating its construction.

My invention has for its object to improve the construction of street-carriages to adapt them more especially for running upon Nicolson and other smooth pavements, and which will make the carriage as convenient as a street-car, while requiring no track; and it consists in the construction, as hereinafter more fully described.

A are the wheels, which are made large so as to roll easily and smoothly, and which revolve upon the journals of the axles B. The axles B are bent twice at right angles near each wheel, as shown in the figure, so as to bring the horizontal middle part of the axle close to the ground. C is the body of the carriage, which is connected with the axles B by bolts D or other guides, so as to keep it in place upon said axles. E are springs interposed between the body C and the axles B, and which should have sufficient strength and elasticity to support the carriage-body and cause it to ride easy. The springs E may be made of steel or other suitable material, and may be of any suitable form. The lower part of the side walls of the body C of the carriage is made double for a sufficient height to form recesses $c'$ to receive the wheels, so that the said wheels may be entirely out of the way and almost entirely out of sight, as shown in the figure, and, at the same time, shall not lessen the carrying capacity of the carriage.

Having thus described my invention, I claim as new and desire to secure by Letters Patent—

The recesses $c'$ formed in the double walls of the sides of the carriage-body C to receive the large wheels A, substantially as herein shown and described.

GEORGE S. McHENRY.

Witnesses:
CHAS. M. FERRIE,
HENRY A. WHITE.